United States Patent [19]

Matsumoto et al.

[11] Patent Number: 5,003,527
[45] Date of Patent: Mar. 26, 1991

[54] SYSTEM FOR RECORDING OPTICAL DISCS FOR USE WITH OPTICAL DISC PLAYBACK ONLY DEVICES

[75] Inventors: Seiji Matsumoto; Katsuichi Osakabe, both of Hamamatsu, Japan

[73] Assignee: Yamaha Corporation, Hamamatsu, Japan

[21] Appl. No.: 271,089

[22] Filed: Nov. 14, 1988

[30] Foreign Application Priority Data

Nov. 13, 1987 [JP] Japan .................................. 62-287029

[51] Int. Cl.$^5$ .............................................. G11B 7/00
[52] U.S. Cl. ..................................... 369/100; 369/109
[58] Field of Search ............................. 369/32, 43–47, 369/100, 109, 111, 116; 250/201; 358/342; 346/76 L, 108

[56] References Cited

U.S. PATENT DOCUMENTS 4,328,506 5/1982 Yoshida et al. .................. 369/116 X
4,873,680 10/1989 Chung et al. .................... 369/116 X

FOREIGN PATENT DOCUMENTS 0130026 1/1985 European Pat. Off. .
0132137 1/1985 European Pat. Off. .

OTHER PUBLICATIONS

Patent Abstracts of Japan, vol. 11, No. 84(P-556) (2531), Mar. 13, 1987 (Relates to Japanese Appln. No. 61-239443, 10/24/86).
Patent Abstracts of Japan, vol. 10, No. 322(P-511) (2378), Oct. 31, 1986 (Relates to Japanese Appln. No. 61-129747, Jun. 17, 1986).

Primary Examiner—Robert L. Richardson
Attorney, Agent, or Firm—Spensley Horn Jubas & Lubitz

[57] ABSTRACT

An optical disc recording system can record data on a writable type optical disc and reproduce the recorded data by utilizing a playback device adapted exclusively for playing back a standardized unwritable optical disc such as a Compact Disc. The optical disc recording system comprises a recording medium and a recording device. The recording medium consists of an optical disc having its recording surface made of a material which is writable with a semiconductor laser and has a relatively high rate of laser beam reflection, having a mechanical size like or compatible with the standard size of an optical disc for playback only and having a pregroove of a relatively small depth. The recording device comprises a data signal outputting circuit for outputting an input signal to be recorded at a predetermined transfer speed as a data signal of a mark length recording system compatible with a standard format of the optical disc for playback only, a drive control circuit for driving the recording medium at a standard speed of the optical disc for playback only and controlling positions of the recording medium and the semiconductor laser so as to be compatible with a standard track pitch of the optical disc for playback only, and a laser control circuit for controlling the irradiation state of the semiconductor laser in accordance with the output of the data signal outputting circuit. The recording medium recorded by the recording device is played back by utilizing a playback device for the optical disc for playback only.

6 Claims, 14 Drawing Sheets

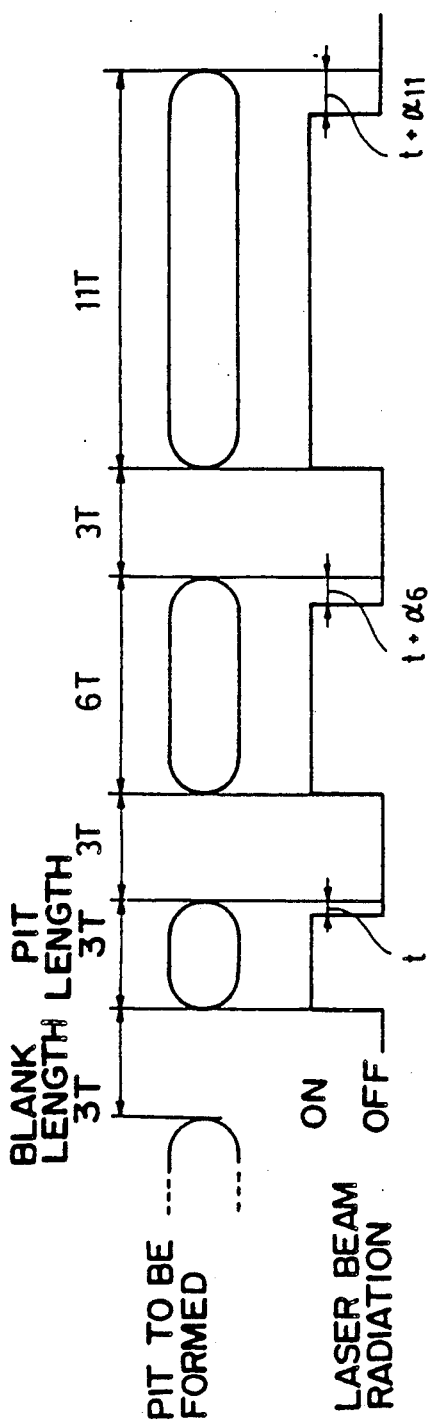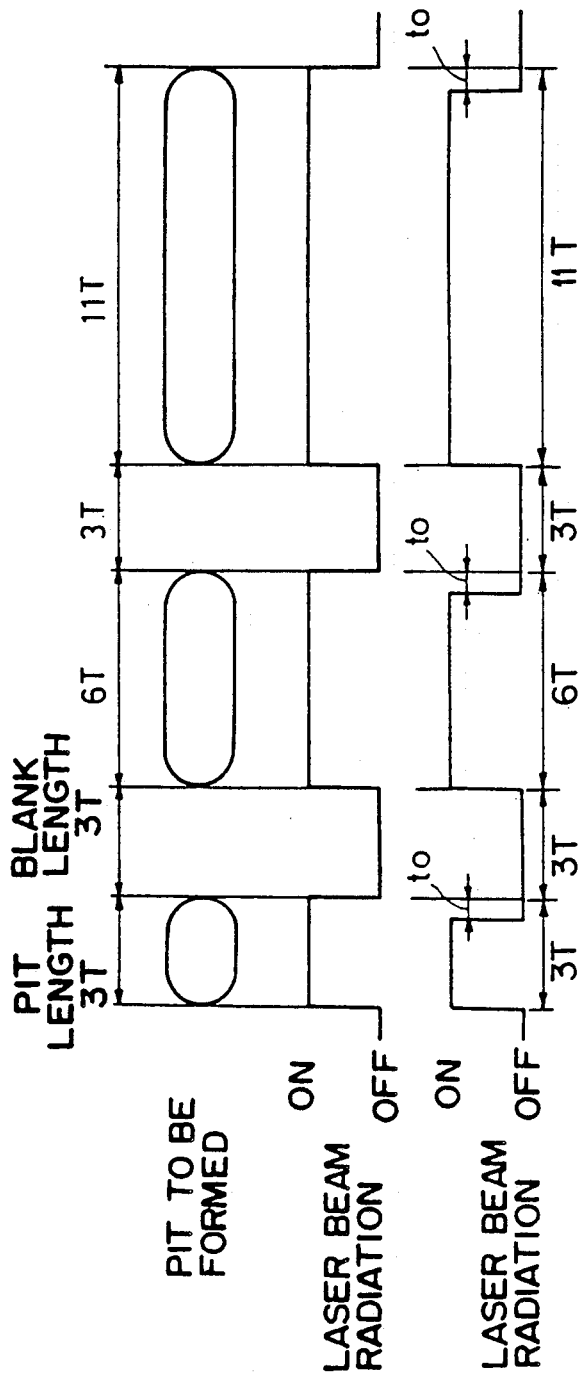

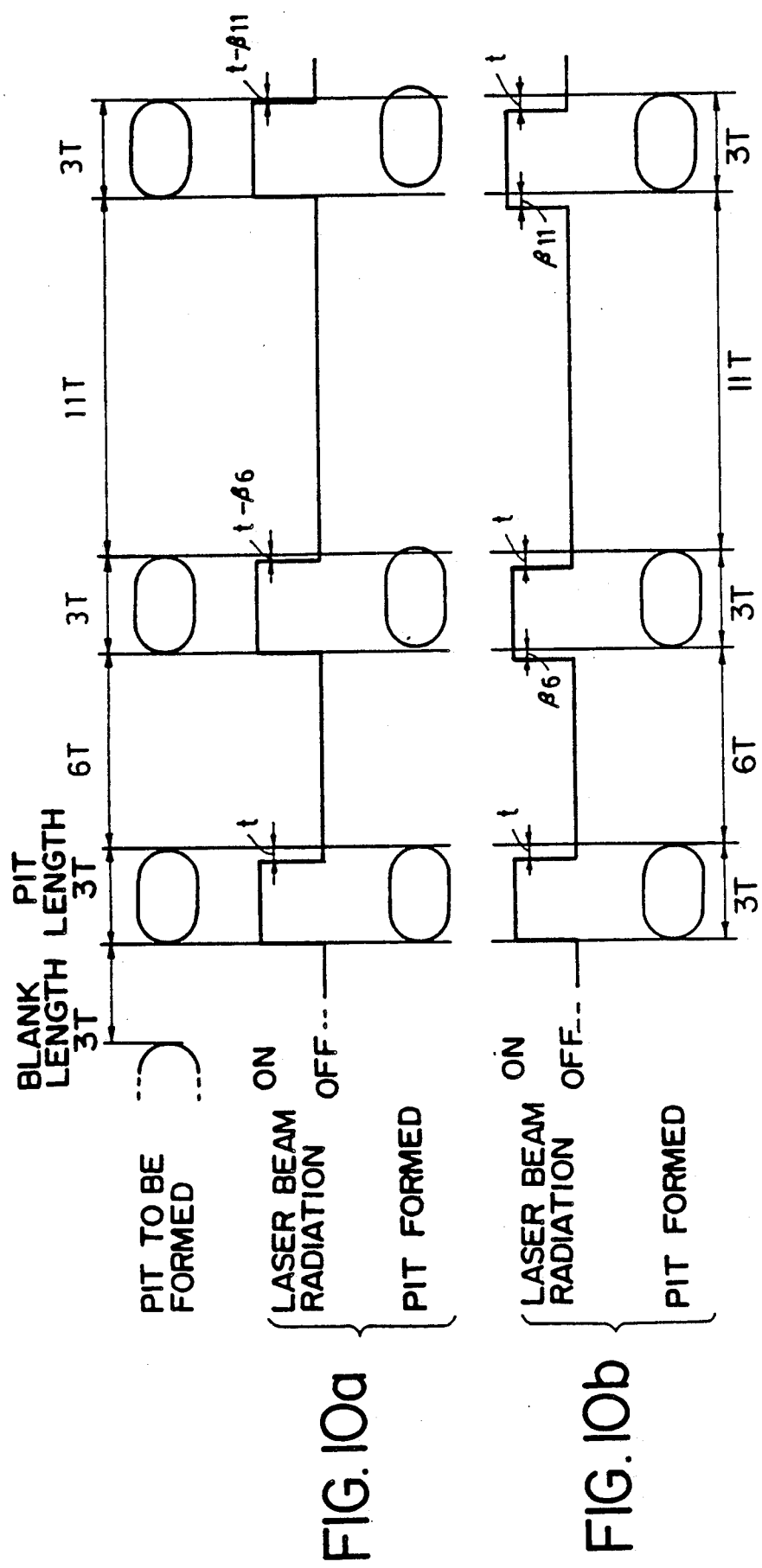

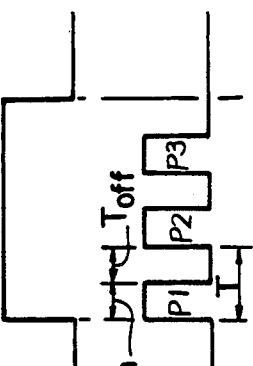
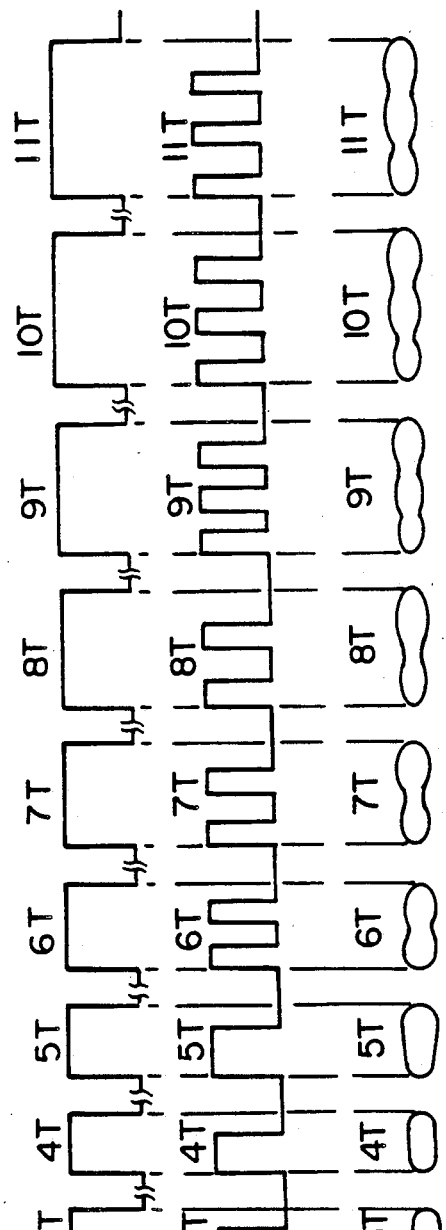
FIG. 19a CONVENTIONAL CONTINUOUS LASER BEAM
FIG. 19b SPLIT LASER BEAM
FIG. 19c CONFIGURATION OF PIT FORMED BY SPLIT LASER BEAM
FIG. 20a CONVENTIONAL CONTINUOUS LASER BEAM
FIG. 20b SPLIT LASER BEAM
FIG. 20c CONFIGURATION OF PIT FORMED BY SPLIT LASER BEAM

SYSTEM FOR RECORDING OPTICAL DISCS FOR USE WITH OPTICAL DISC PLAYBACK ONLY DEVICES

BACKGROUND OF THE INVENTION

This invention relates to a novel optical disc recording system for recording information on and reproducing it from a writable type optical disc, and, more particularly, to an optical disc recording system capable of playing back a recorded optical disc by utilizing a playback device adapted exclusively for playing back a standardized optical disc which is not writable such as a CD (Compact Disc), CD-ROM, CD-I (CD-Interactive), CDV (Compact Disc with video) or LV (laser vision disc) (such optical disc will hereinafter be referred to as "optical disc for playback only") and thereby obviating the necessity for using a playback device adapted exclusively for playing back the recorded disc.

As writable type optical discs, there are DRAW (direct read after write) discs and E-DRAW (erasable type DRAW) discs. DRAW discs are discs on which data can be written only once and include a type of disc on which an information pit is formed by burning off a metal recording film by heat generated by irradiation by a laser beam.

E-DRAW discs are discs on which information can be rewritten and include one utilizing a technique of photo-magnetic recording and one utilizing phase change between a crystal state and an amorphous state.

Since these prior art DRAW discs and E-DRAW discs are different from optical discs for playback only such as CD, CD-ROM, CD-I, LV discs etc. in their recording format, configuration of the disc (such as the outer diameter), revolution velocity and in other respects, the DRAW discs and E-DRAW discs cannot be played back with playback devices adapted exclusively for playing back such optical discs for playback only.

Even if the recording format, disc configuration etc. are the same as the optical discs for playback only, the E-DRAW discs using the photo-magnetic recording or phase change are low in the rate of light reflection (i.e., rate of light reflection in a mirror portion (non-grooved portion) is, for example, less than 50%) and, accordingly, such DRAW and E-DRAW discs cannot be played back with the playback devices for the optical discs for playback only.

The prior art DRAW discs in which an information pit is formed by burning off the metal film (e.g., Al, Au or the like) by irradiation by a laser beam have a sufficient rate of light reflection but they require a powerful laser device such as one using a gas laser to record information with a result that the recording device tends to become so bulky and expensive that it prohibits use of the system in devices for domestic uses.

It is, therefore, an object of the invention to eliminate the above described drawbacks of the prior art optical disc recording systems and provide an optical disc recording system capable of utilizing a playback device adapted for playing back an optical disc for playback only in playing back a recorded disc and capable of construction of the recording device cheaply and in a compact form.

SUMMARY OF THE INVENTION

An optical disc recording system achieving the above described object comprises recording medium means consisting of an optical disc having its recording surface made of a material which is writable with a semiconductor laser and having a relatively high rate of light reflection, having a mechanical size agreeing with a standard size of an optical disc for playback only and having a pregroove of a relatively small depth, and a recording device comprising data signal outputting means for outputting an input signal to be recorded at a predetermined transfer speed as a data signal of a mark length recording system agreeing with a standard format of the optical disc for playback only, drive control means for driving the recording medium means at a standard speed of the optical disc for playback only and controlling positions of the recording medium means and the semiconductor laser so as to agree with a standard track pitch of the optical disc for playback only, and laser control means for controlling the irradiation state of the semiconductor laser in accordance with the output of the data signal outputting means, the recording medium means recorded by the recording device being played back by utilizing a playback device for the optical disc for playback only.

According to the invention, the recording device effects recording on the recording medium means compatible with a standard size by using a standard format, track pitch, transfer speed and revolution number agreeing respectively with an optical disc for playback only so that the recording medium means can be played back with the playback device adapted exclusively for playing back the optical disc for playback only.

Besides, since the recording surface of the recording medium is made of a material which has a relatively high rate of light reflection, the recording medium can be played back adequately with a semiconductor laser which is used for the playback device for the optical disc for playback only.

Further, since the recording medium means has a pregroove of a relatively small depth, the recording device can effect recording on the recording medium means with a relatively low power laser beam as will be described more fully later so that a semiconductor laser can be used, and this enables compact and cheap construction of the recording device with a resulting realization of use of the system in devices for domestic uses.

A preferred embodiment of the invention will now be described with reference to the accompanying drawings.

BRIEF DESCRIPTION OF THE DRAWINGS

In the accompanying drawings,

FIG. 6 is a diagram showing an example of a recording laser beam in a prior art device;

FIG. 10, including (a) and (b), is a diagram showing an example of a recording laser beam according to the invention in which the irradiation time has been corrected in accordance with the immediately preceding blank length;

FIG. 11 is a diagram showing an example of a recording laser beam in which the irradiation time has been corrected in accordance with pit length of a pit to be formed;

FIG. 19, (a)–(c), is a diagram showing an example of a split laser beam and an example of the shape of a pit formed by the split laser beam;

FIG. 20, (a)–(c), is a diagram showing an example of the shapes of pits of respective lengths formed by the split laser beam;

DESCRIPTION OF A PREFERRED EMBODIMENT

A preferred embodiment of the invention will now be described.

Figure 1:
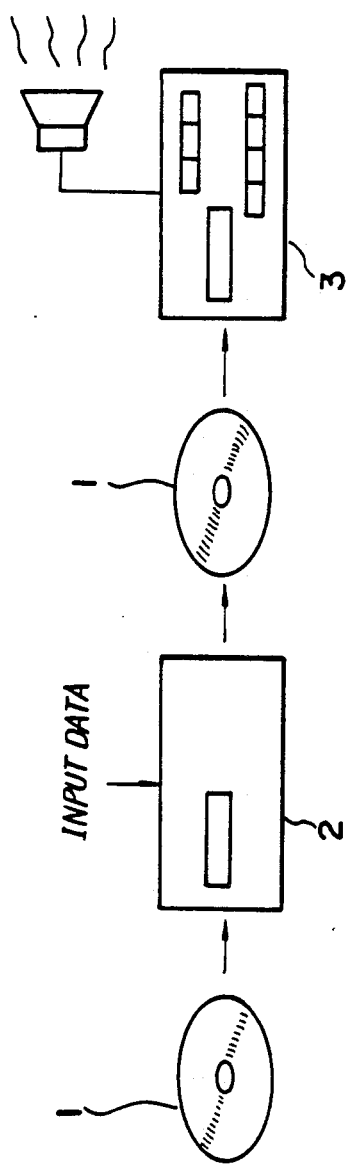
FIG. 1 is a block diagram showing an embodiment of the invention.

FIG. 1 schematically shows an entire system from recording to playback including an embodiment of the invention.

An optical disc 1 which constitutes recording medium means has its recording surface made of a material on which information can be recorded with a semiconductor laser and which has a relatively high rate of light reflection. The optical disc 1 further is so constructed that its mechanical size agrees with the standard size of an optical disc for playback only (CD, CD-ROM, CD-I, CDV, LV or the like) to be played back by a playback device 3 and has a pregroove of a relatively small depth.

A recording device 2 effects recording of information on the optical disc 1 by outputting, at a predetermined transfer speed, an input signal to be recorded as a data signal of a mark length recording system agreeing with a standard format of the optical disc for playback only to be played back by the playback device 3, driving the optical disc 1 at a standard speed of the optical disc for playback only (i.e., at a predetermined revolution number determined from a standard linear velocity and transfer speed of the data signal in the case of a CLV (constant linear velocity) disc and at a standard revolution number in the case of a CAV (constant angular velocity) disc, controlling positions of the optical disc 1 and the semiconductor laser by a pregroove preformed on the optical disc 1 so as to agree with a standard track pitch of the optical disc for playback only, and controlling the irradiation state of the semiconductor laser in accordance with the data signal so that the laser beam breaks through the recording surface of the optical disc 1 to form a pit.

The optical disc 1 on which information has been recorded by the recording device 2 is played back by using a selected one of playback devices adapted for playing back the optical discs for playback only (CD, CD-ROM, CD-I, CDV, LV and the like).

Which type of playback device for an optical disc for playback only should be used for playing back of the optical disc 1 can be determined depending upon the type of input data to be recorded. In the case of audio data, for example, a Compact Disc system can be utilized. In this case, an optical disc compatible with the standard size of a CD can be used as the optical disc 1, a recording device which records data on the optical disc 1 with the standard format and linear velocity of a CD can be used as the recording device 2 and a CD player or a player used both for a CD and an LV can be used as the playback device 3.

Similarly, the type of playback device for an optical disc for playback only used for playing back of the optical disc 1 can be determined depending upon the type of input data to be recorded such, for example, as an LV system or a CDV system in the case of video plus audio data, a CD-ROM system in the case of computer data, and a CD-I system in the case of digital data such as computer data, audio data and still picture data.

A specific example of the system of FIG. 1 will now be described. In this example, description will be made of a case where a CD system is utilized as the system for playing back an optical disc for playback only and information is recorded on record medium means so that it can be played back with the conventional CD player.

In this example, the characteristics of the record medium means are as shown in the following Table 1:

TABLE 1

| | |
|---|---|
| Reflection rate in mirror (plane) portion | 59%–75% |
| Outer diameter of disc | 120 mm |
| Mechanical size | Same as CD standard |
| Depth of pregroove | 20–50 nm |
| Width of pregroove | 0.3–1.3 μm |
| Position of recording | Pregroove |
| Signal format | Same as CD standard |
| Linear velocity | 1.2–1.4 m/sec. |
| Laser beam reflection rate in recording section | 35% or over |

Figure 2:
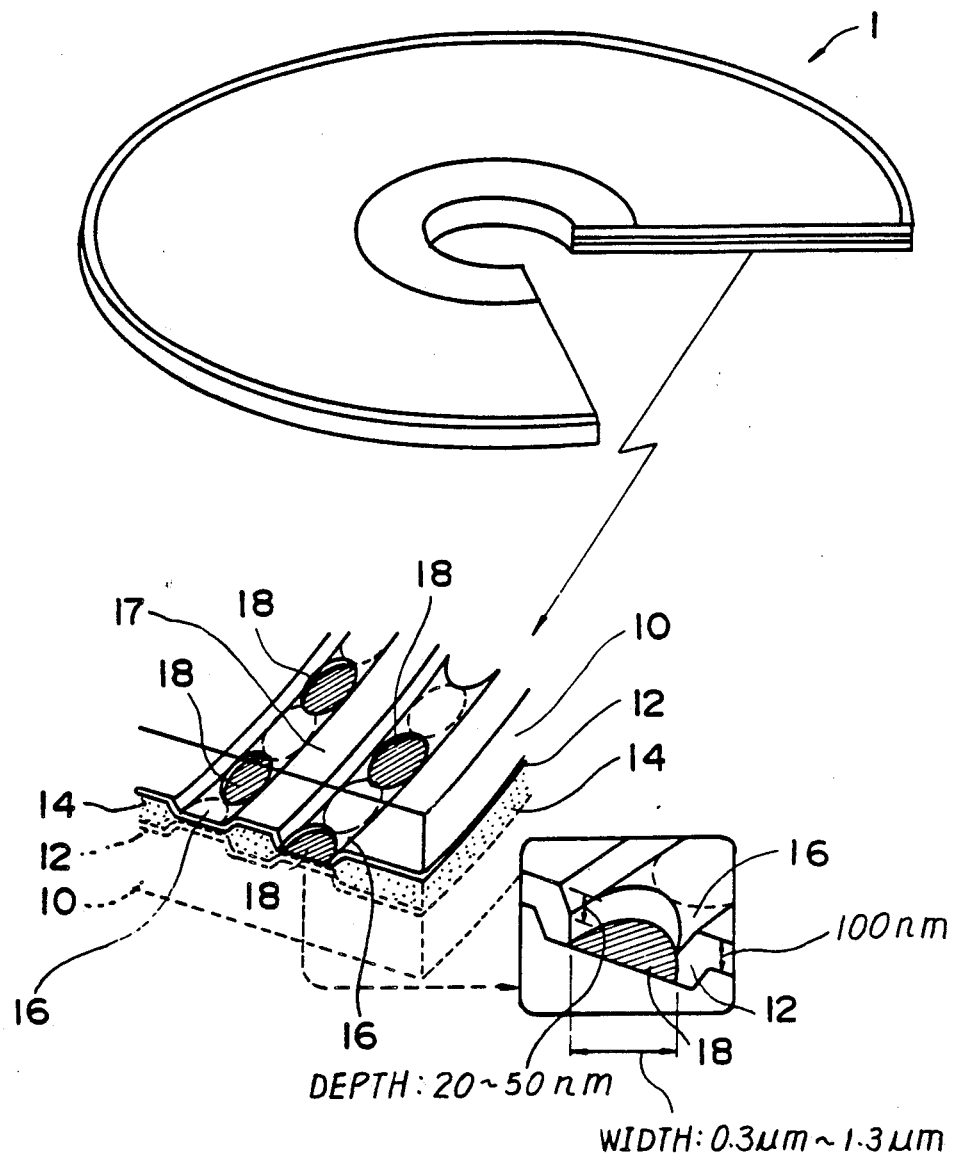
FIG. 2 is a perspective view of an optical disc 1 in FIG. 1.

An example of the recording medium means is shown in FIG. 2.

The disc 1 consists of a single plate composed of a transparent disc substrate 10 made of material such as polycarbonate or acrylic resin (e.g., PMMA) and a thin film 12 having a thickness of about several tens of nanometers made of a suitable material such as alloy including metal such as In, Bi or Sn (e.g., In-An-GeS alloy) or TeC system alloy.

A pregroove (guide groove) 16' is formed on the substrate 10 and film 12 and the portion of the film 12 on this pregroove 16' is burnt off with a laser beam to form a pit 18 on which information is recorded. The depth of the pregroove 16' is set at 20–50 nm and the width of the pregroove 16' is set at 0.3–1.3 μm.

Figure 3:
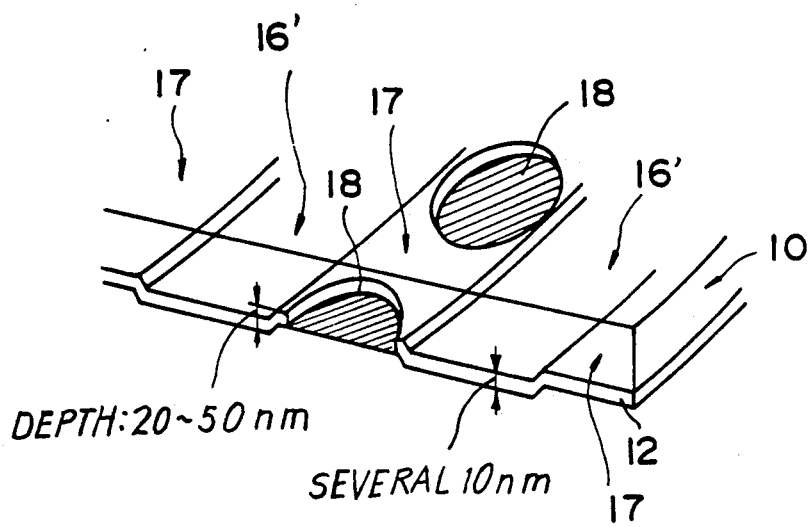
FIG. 3 is an enlarged view of a disc recording surface in the case where a land recording is performed.

In a case where the pit 18 is formed in the pregroove 16' as shown in FIG. 2, the recorded signal can be read by either of the three-beam method and the push-pull method. In a case where the pit 18 is formed in a land 17 as shown in FIG. 3, the recorded signal can be read by the three-beam method but cannot be read by the push-pull method.

If the film 12 on the disc substrate 10 is made of the alloy including metal such as In, Bi or Sn (e.g., In-An-GeS alloy) or TeC system alloy as described above, the reflection rate in the mirror (plane) portion can be increased to 59–75% and this enables a conventional CD player to play back the optical disc 1.

Figure 4:
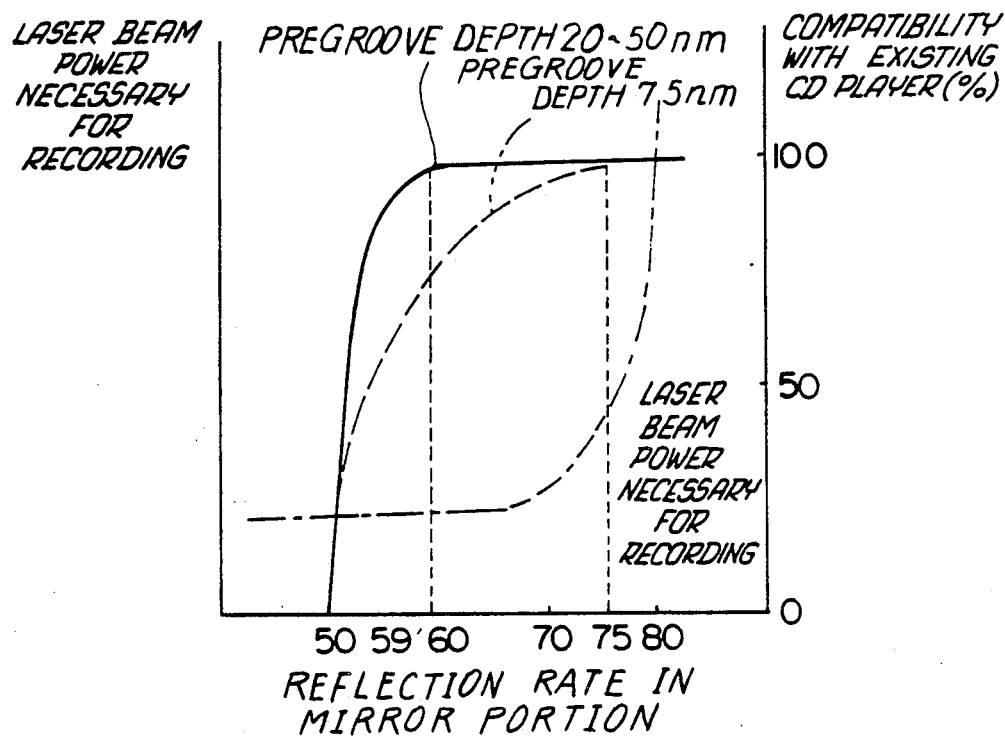
FIG. 4 is a characteristic diagram showing the relationship between the mirror reflection rate and compatibility with prior art Compact Disc players and the relationship between the mirror reflection rate and the laser beam power necessary for recording.

FIG. 4 shows relations between the reflection rate in the mirror portion and compatibility of conventional CD players (100% being a state in which the optical disc 1 can be played by all conventional CD players) and between the reflection rate and recording power. If the depth of the pregroove 16' is 20–50 nm as in this example, the compatibility becomes about 100% when the reflection rate in the mirror portion is 59% or over. In contrast, if the depth of the pregroove 16' is made deeper as is conventionally practiced (e.g., 75 nm), the compatibility does not become 100% unless the reflection rate in the mirror portion is increased to 75% or over. The reason for this will now be described briefly. The reflection rate in the mirror portion herein means reflection rate in a portion of the disc where the pregroove 16' is not formed and the reflection rate decreases to some extent when the pregroove 16' is formed. The smaller the depth of the pregroove 16', the smaller is the rate of decrease in the reflection rate with a resulting increase in compatibility. If a metal film such as aluminum film is formed for increasing the reflection rate in the mirror portion, high laser power is required for recording information by breaking through the film 12 made of such metal film and a powerful laser system such as a gas laser system is required for increasing the reflection rate in the mirror portion to 75% or over as is conventionally practiced. In contrast, if the reflection rate in the mirror portion is set at 59–75% as in the present example by selecting a suitable material and setting the depth of the pregroove 16' at a relatively small depth of 25–35 nm, recording can be realized with a relatively low laser beam power and, moreover, compatibility of 100% can be obtained so that recording by the semiconductor laser can be made and a compact and cheap recording device can be constructed.

Figure 5:
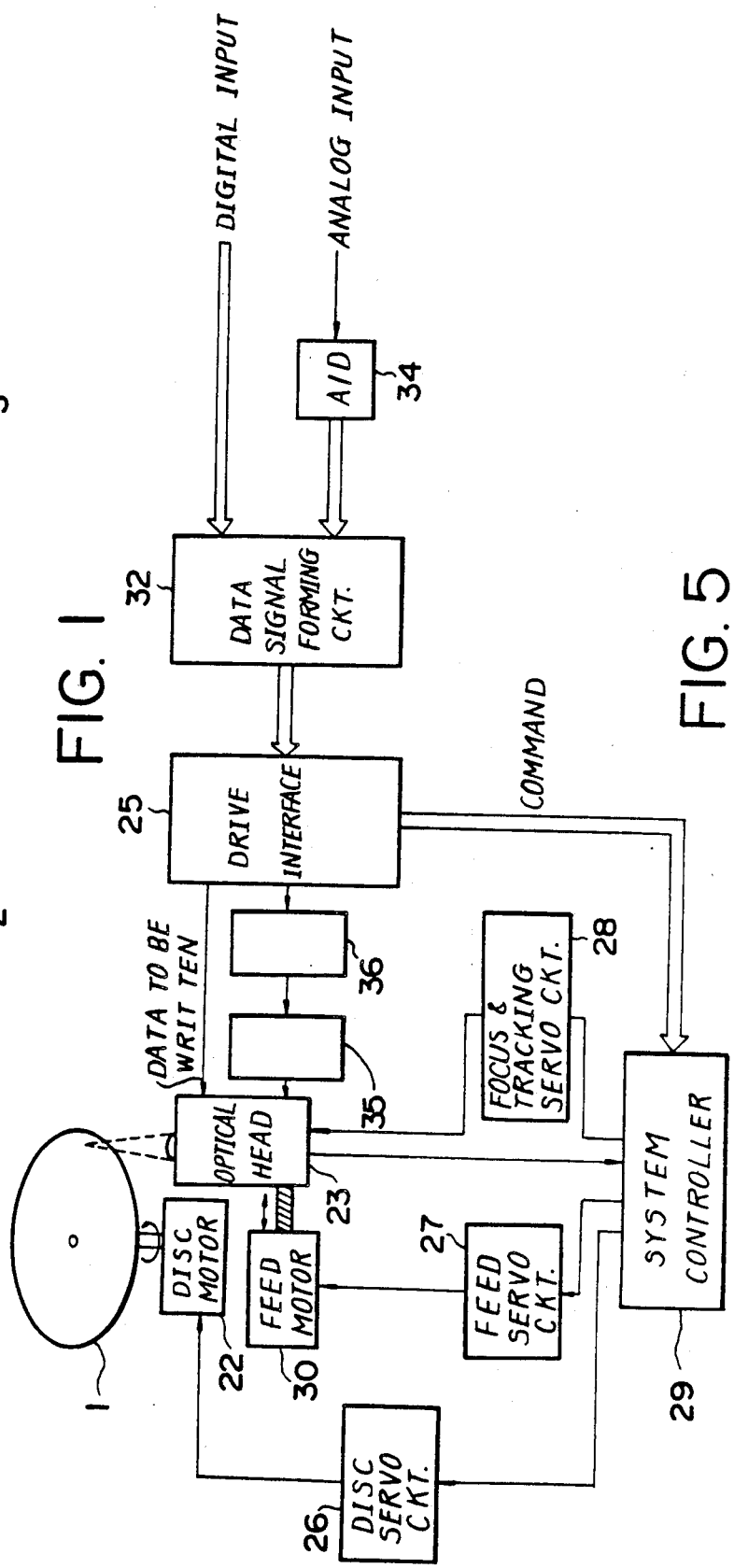
FIG. 5 is a block diagram showing an example of the recording device of FIG. 1.

A specific example of the recording device 2 of FIG. 1 is shown in FIG. 5.

The optical disc 1 is formed in a size compatible with a Compact Disc.

A disc servo circuit 26 controls a disc motor 22 at a constant linear velocity by a command from a system controller 29. This constant linear velocity control is performed by operation control based on the position of an optical head 23.

A focus servo and tracking servo control circuit 28 controls focus and tracking of a laser beam irradiated from a semiconductor laser housed in the optical head 23 in accordance with a command from the system controller 29. The tracking control is performed by detecting a pregroove formed on the disc 1. A feed servo circuit 27 displaces the optical head 23 in the radial direction of the disc 1 by driving a feed motor 30 in accordance with a command from the system controller 29.

An input signal to be recorded on the optical disc 1 is applied directly to a data signal forming circuit 32 if the input signal is a digital signal and is applied to the data signal forming circuit 32 through an analog-to-digital converter 34 if the input signal is an analog signal. The sampling frequency and the data bit number of this input data are assumed to be compatible with CD data. The data signal forming circuit 32 imparts an error check code to the input data to form a subcode by subjecting the input data to interleave processing and forms and outputs a series of serial data with a format and transfer rate agreeing with a CD by EFM modulating the input data.

This data is applied to a laser generation circuit 35 through a drive interface 25 and after correction by a data signal correction circuit 36 in a predetermined manner. The laser generation circuit 35 irradiates a laser beam on the recording surface of the optical disc 1 by driving the semiconductor laser in the optical head 23 in accordance with the data signal and thereby effects recording. Thus, data is recorded on the optical disc 1 with the format, transfer speed and linear velocity (1.2–1.4 m/sec.) agreeing with a CD.

Data signal correction by the data signal correction circuit 36 will now be described.

The data signal correction circuit 36 corrects the waveform of the data signal in accordance with the pit length of its pit and immediately preceding blank length thereof. That is, the difference in position between data signal timing and recorded pit and blank due to a heat accumulation effect caused by the laser beam irradiated on the recording surface of the optical disc 1 is reduced by increasing or decreasing the data signal timing, and an increase in the width of the recorded pit is prevented by splitting the data signal timing. More specifically, as regards the increase and decrease control of the data signal timing, in forming a pit whose immediately preceding blank length is short, the irradiation time of the laser beam is shortened. In forming a pit whose immediately preceding blank length is long, the start of irradiation of the laser beam is quickened. In forming a long pit, the irradiation time of laser beam is shortened. As regards the splitting of the data signal timing, the split number, the pulse width and the pulse intensity of each split laser beam pulse are so determined that the bit width is formed in the range of 0.3–0.9 μm.

These correction controls will be described more fully below.

REGARDING INCREASING AND DECREASING CONTROL OF DATA SIGNAL TIMING

In the prior art recording method, this recording has generally been performed by irradiating a laser beam for a period of time corresponding to the length of a pit to be formed (e.g., 231 nsec for 1T in a Compact Disc) as shown in (a) in FIG. 6 or by irradiating a laser beam for a period of time corresponding to the length of a pit to be formed minus a predetermined length of time t0 as shown in (b) of FIG. 6.

Pit length or blank length can be set at various values depending upon consecutive times of occurrence of "1" or "0" of data to be recorded (e.g., 3T to 11T in a Compact Disc format). The length of a pit formed varies depending upon the length of a blank immediately before the pit (hereinafter referred to as "immediately preceding blank length"). As immediately preceding blank length decreases, the degree of influence of heating made in forming an immediately preceding pit on forming a next pit increases with a result that the recording film is melted more quickly in forming the next pit. Accordingly, even if the radiation time of the laser beam is the same, pit length of an actually formed pit increases as the immediately preceding blank length decreases.

Figure 7:
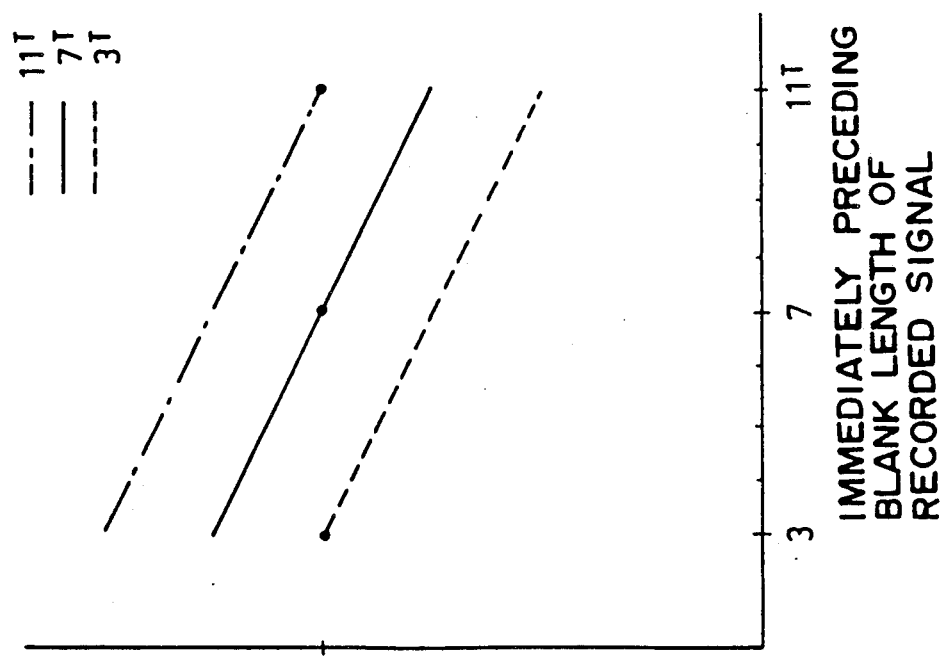
FIG. 7 is a diagram showing the shift of bit length in the event the irradiation time is not corrected in accordance with the immediately preceding blank length.

FIG. 7 shows an example of variation of pit length of an actually formed pit depending upon immediately preceding blank length with respect to pits of 3T, 7T and 11T. In this figure, the combination of pit length and blank length of the same time length is taken as reference Ref for each pit length and deviation from the reference Ref for each pit length is plotted. As will be apparent from the figure, as immediately preceding blank length decreases, the recording film is melted more quickly due to influence of heating made in forming a preceding pit so that the pit length increases despite the same radiation time of the laser beam. This causes jitter in a reproduced signal with resulting occurrence of errors and deterioration in the signal-to-noise ratio in the reproduced signal.

The variation in immediately preceding blank length causes variation not only in pit length but also in relationship between a radiation start position and a pit starting end position of a pit formed by the radiation. That is, as immediately preceding blank length increases, distance between the radiation start position and the pit starting end position increases. This is because influence of heat from an immediately preceding pit decreases as the immediately preceding blank length increases with a result that it becomes harder to melt the recording film.

For this reason, if it is assumed that radiation is started at a predetermined radiation start position irrespectively of immediately preceding blank length, the pit starting end position is increasingly deviated behind as the immediately preceding blank length increases so that a correct blank length cannot be obtained. Since pit length and blank length have the same data weight for recorded data, this also causes jitter in a reproduced signal.

When a pit is formed on a disc, since time length during which the laser beam is irradiated increases with increase in the pit length, the degree of heating of the recording film increases with increase in the pit length with a result that the recording film tends to be melted more quickly as the pit length increases.

Figure 8:
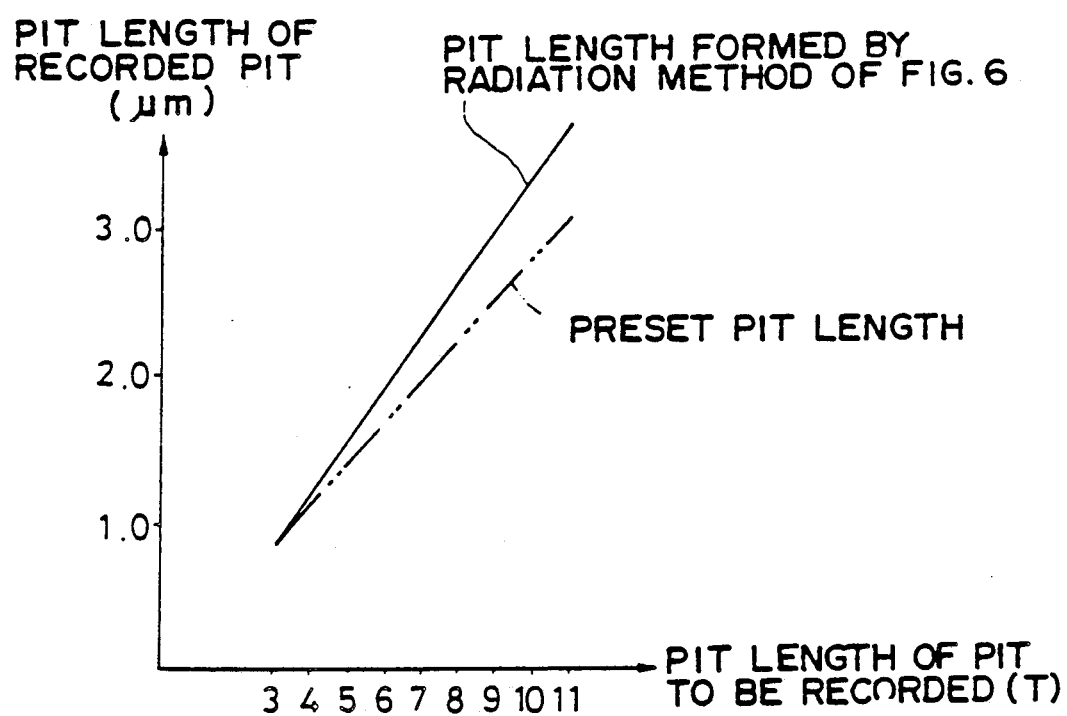
FIG. 8 is a diagram showing pit length of a pit formed by the laser beam of FIG. 6.
Figure 9:
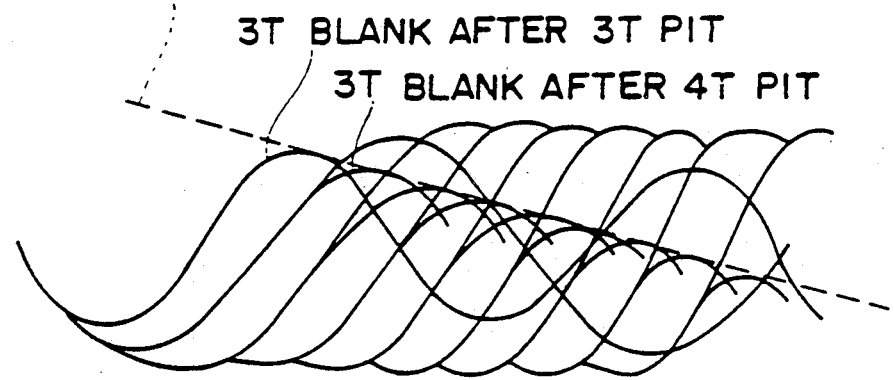
FIG. 9 is a diagram showing an eye pattern of a reproduced signal from a pit formed by the laser beam of FIG. 6.

For this reason, in prior art recording devices in which the laser beam is irradiated for a period of time corresponding to the pit length regardless of magnitude of the pit length as shown in (a) or (b) in FIG. 6, the pit length of a pit which is actually formed becomes increasingly larger than a preset value as the pit length increases as shown in FIG. 8 (on condition that the length of the blank immediately before the pit remains the same) even if power of laser beam is adjusted so as to obtain a preset pit length at, e.g., a pit of 3T. As viewed in eye patterns of reproduced signal waveforms shown in FIG. 9, eye patterns of reproduced signal waveforms in which blanks of 3T are formed respectively immediately after pits of 3T to 11T show that amplitude of the blank of 3T decreases as the pit length increases. This indicates that the actual pit length becomes increasingly larger than a preset value as the pit length increases. This causes jitter in a reproduced signal with resulting occurrence of errors and deterioration in the signal-to-noise ratio in the reproduced signal.

A data signal correction circuit 36 shortens radiation time of the laser beam when a pit of a short immediately preceding blank is to be formed.

Since, as described above, a pit formed tends to become longer relative to the radiation time as the immediately preceding blank length decreases, shortening of the radiation time cancels the tendency to increasing of pit length whereby a pit of pit length which is closer to a set value can be formed. This contributes to reduction of jitter in a reproduced signal with resulting reduction in error and improvement in the signal-to-noise ratio in the reproduced signal.

Since, as described before, the pit starting end position tends to be increasingly deviated behind relative to the radiation start position as immediately proceding blank length increases, the data signal correction circuit 36 advances starting of radiation of the laser beam in forming a pit after a larger immediately preceding blank length and thereby enables adjusting of the pit starting end position to a predetermined position so that blank length which is closer to a set value can be obtained and jitter in a reproduced signal can further be reduced.

Since, as described above, the pit tends to become longer as compared with the radiation time as the pit length increases, the radiation time is shortened when a pit of a large pit length is formed so that the tendency to forming of a longer pit is cancelled and a pit length which is close to a specified length is formed.

A specific example of the correcting control of the radiation time and the timing of start of radiation by the data signal correction circuit 36 will be described more fully below.

(1) Correction of radiation time in accordance with immediately preceding blank length Since, as described before, pit length of a pit formed tends to become longer relative to radiation time as immediately preceding blank length decreases, as shown in FIG. 10, radiation time is shortened as immediately preceding blank length decreases thereby cancelling the tendency to increasing of the pit length.

An example of radiation time for various immediately preceding blank lengths when pit length NT (N being 3, 4, ... 11) of a pit to be formed is made constant is shown in the following Table 2:

TABLE 2

| Immediately preceding blank length | Radiation time for forming a pit of pit length NT |
|---|---|
| 3T | $N \cdot TO - (t + \beta_{3,N})$ |
| 4T | $N \cdot TO - (t + \beta_{4,N})$ |
| 5T | $N \cdot TO - (t + \beta_{5,N})$ |
| . | . |
| . | . |
| 11T | $N \cdot TO - (t + \beta_{11,N})$ | where TO = 1/4.3218 MHz
t = 0 to 500 nsec
$\beta_{3,N} > \beta_{4,N} > \beta_{5,N} > \beta_{11,N}$ By obtaining optimum values of t and $\beta_{n,N}$ of Table 2 by experiments, a pit of pit length which is close to a predetermined value can be formed regardless of the magnitude of the immediately preceding blank length. As a result, jitter in the reproduced signal is reduced so that occurrence of errors is reduced and the signal-to-noise ratio is improved in the reproduced signal.

(2) Correction of timing of start of radiation in accordance with immediately preceding blank length As described before, the pit starting end position tends to be increasingly deviated behind relative to the radiation start position as immediately preceding blank length increases.

For this reason, if the correction of radiation time in accordance with immediately preceding blank length described in (1) above is made in a rear portion of the radiation time as shown in (a) of FIG. 10 (i.e., in such a manner that the amount of correction is reduced from the rear portion) while maintaining the radiation start position constant regardless of the immediately preceding blank length, a correct pit length can be obtained but the position of the pit is deviated (i.e., the pit position is deviated increasingly behind with increase in immediately preceding blank length and the amount of deviation of the pit position varies substantially in proportion to immediately preceding blank length) with a result that correct blank length cannot be obtained. Since pit length and blank length have equal data weight for recorded data, such error in the blank length causes error in a reproduced signal.

According to the invention, correction of radiation time in accordance with immediately preceding blank length is performed in a starting end portion of radiation time (i.e., in such a manner that the amount of correction is added to the starting end portion) as shown in (b) of FIG. 10. This arrangement enables a pit to be formed at a correct position whereby a correct blank length can be obtained.

(3) Correction of radiation time in accordance with pit length of a pit to be formed Since, as described before, a pit formed on the recording film tends to become longer relative to radiation time as the pit length increases, radiation time is shortened as the pit length increases as shown in FIG. 11 thereby cancelling the tendency to increasing of the pit length.

An example of radiation time for various pit lengths when immediately preceding blank length is made constant (3T) is shown in the following Table 3:

TABLE 3

| Pit length of a pit to be formed | Radiation time |
|---|---|
| 3T | $3 \cdot TO - t$ |

TABLE 3-continued

Figure 12:
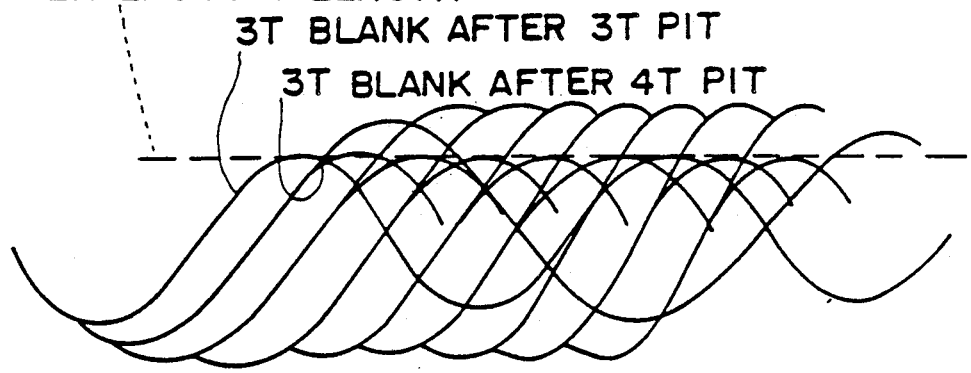
FIG. 12 is a diagram showing an eye pattern of a reproduced signal from a pit formed by the laser beam of FIG. 11.
Figure 13:
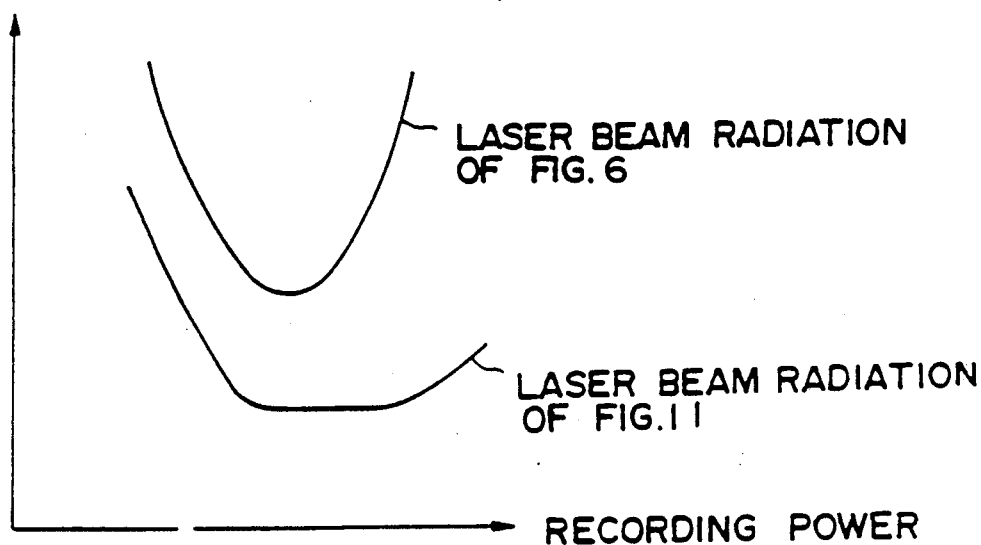
FIG. 13 is a diagram showing the relative ratio of jitter to recording power of the reproduced signal of the pit formed by the laser beam of FIG. 11.
Figure 14:
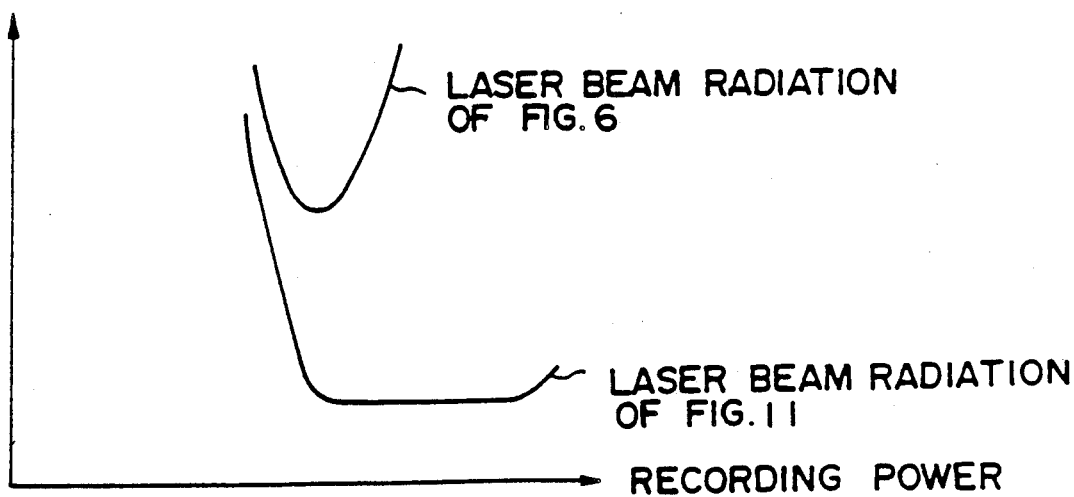
FIG. 14 is a diagram showing the relative ratio of error occurrence to recording power of the reproduced signal of the pit formed by the laser beam of FIG. 11.

| Pit length of a pit to be formed | Radiation time |
|---|---|
| 4T | $4 \cdot TO - (t + \alpha_4)$ |
| 5T | $5 \cdot TO - (t + \alpha_5)$ |
| . | . |
| . | . |
| 11T | $11 \cdot TO - (t + \alpha_{11})$ | where TO = 1/4.3218 MHz
t = 0 to 500 nsec
$\alpha_n$ = 0 to 100 nsec
(n = 4, 5, ..., 11)
$\alpha_4 < \alpha_5 < ... < \alpha_{11}$ By obtaining optimum values of t and $\alpha$ in Table 3 by experiments, a pit of pit length which is close to a predetermined value can be formed regardless of the magnitude of the pit length. In this case, as shown in the eye patterns of FIG. 12, the amplitude of 3T blank after pits of pit lengths ranging from 3T to 11T is substantially constant. As a result, the relative ratio of jitter with respect to recording power is reduced as compared with the prior art radiation method as shown in FIG. 13. Accordingly, the relative ratio of errors with respect to recording power is also reduced as compared with the prior art radiation method as shown in FIG. 14.

(4) Correction of radiation time and timing of starting radiation by combination of pit length and immediately preceding blank length Since, as described before, pit length of a pit to be formed is influenced by pit length and immediately preceding blank length, pit length which is closer to a predetermined value can be obtained by determining the amount of correction by combination of pit length and immediately preceding blank length. An example of radiation time obtained by various combinations of pit length and immediately preceding blank length is shown in the following Table 4:

TABLE 4

| Immediately preceding blank length | Pit length of a pit to be formed | Radiation time |
|---|---|---|
| 3T | 3T | $3 \cdot TO - (t + \gamma_{3,3})$ |
| 4T | 3T | $3 \cdot TO - (t + \gamma_{4,3})$ |
| . | . | . |
| 11T | 3T | $3 \cdot TO - (t + \gamma_{11,3})$ |
| 3T | 4T | $4 \cdot TO - (t + \gamma_{3,4})$ |
| 4T | 4T | $4 \cdot TO - (t + \gamma_{4,4})$ |
| . | . | . |
| 11T | 4T | $4 \cdot TO - (t + \gamma_{11,4})$ |
| . | . | . |
| . | . | . |
| 3T | 11T | $11 \cdot TO - (t + \gamma_{3,11})$ |
| 4T | 11T | $11 \cdot TO - (t + \gamma_{4,11})$ |
| . | . | . |
| 11T | 11T | $11 \cdot TO - (t + \gamma_{11,11})$ | where TO = 1/4.3218 MHz
t = 0 to 500 nsec
$\gamma_{m,n}$ = 0 to 100 nsec
(m: blank length, n: pit length,
m, n = 3, 4, ..., 11)

Figure 15:
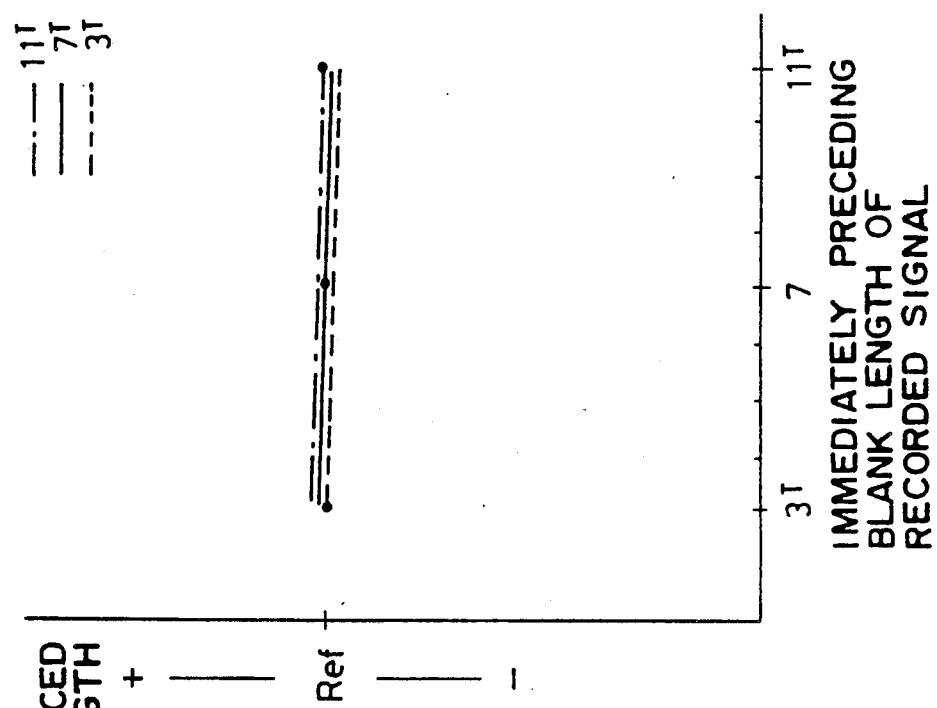
FIG. 15 is a diagram showing the shift of pit length in the case where irradiation time has been corrected in accordance with the immediately preceding blank length.

For the same pit length n, $\gamma_{3,n} > \gamma_{4,n} > ... > \gamma_{11,n}$
For the same immediately preceding blank length m, $\gamma_{m,3} < \gamma_{m,4} < ... < \gamma_{m,11}$ In a case where radiation time $3 \cdot TO - (t + \gamma_{3,3})$ for immediately preceding blank length 3T and pit length 3T is T3, radiation time $7 \cdot TO - (t + \gamma_{7,7})$ for immediately preceding blank length 7T and pit length 7T is T7 and radiation time $11 \cdot TO - (t + \gamma_{11,11})$ for immediately preceding blank length 11T and pit length 11T is T11, the radiation time was corrected in accordance with immediately preceding blank length as shown in Table 5. Deviation of center positions of pit lengths in this case were as shown in FIG. 15. From this figure, it will be understood that deviation of pit length is reduced as compared with the case of FIG. 7 where no correction of radiation time in accordance with immediately preceding blank length is made.

TABLE 5

| Immediately preceding blank length | Pit length of a pit to be formed | Radiation time |
|---|---|---|
| 3T | 3T | T3 |
| 7T | 3T | T3 + 20 nsec |
| 11T | 3T | T3 + 40 nsec |
| 3T | 7T | T7 − 20 nsec |
| 7T | 7T | T7 |
| 11T | 7T | T7 + 20 nsec |
| 3T | 11T | T11 − 40 nsec |
| 7T | 11T | T11 − 20 nsec |
| 11T | 11T | T11 |

If, in this case also, correction of radiation time in accordance with immediately preceding blank length is made in the starting end portion of radiation time (i.e., the amount of correction is added to the starting end portion), a pit can be formed at a predetermined position so that a correct blank length can also be obtained.

In the foregoing embodiment, description has been made about a case where radiation power is constant. The invention can also be applied to a case where a control for varying radiation power is performed in accordance with pit length and immediate blank length.

SPLITTING OF DATA SIGNAL TIMING

Figure 16:
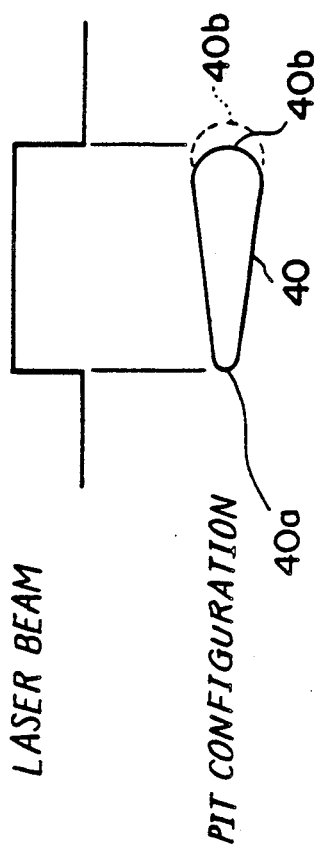
FIG. 16 is a diagram showing an example of the shape of a pit formed by using a conventional continuous laser beam.

In the prior art device in which a laser beam is irradiated continuously on a disc for a period of time corresponding to the pit length of a pit to be formed, a pit 40 formed has, as shown in FIG. 16, a relatively smaller amount of melt in its front edge portion 40a and a relatively larger amount of melt in its rear edge portion 40b whereby the pit formed assumes a shape of a rain drop. This phenomenon occurs for the reason that the recording portion of the disc is increasingly heated by the continuous irradiation of the laser beam with resulting increase in the amount of melt in the rear edge portion 40b.

Figure 17:
FIG. 17 is a diagram showing a situation in which the front edge portion is inadequately melted by using the conventional continuous laser beam.

For this reason, the rear edge portion 40b of a pit tends to become excessively molten as shown by broken line 40b' in FIG. 16 with a result that the position of the rear edge portion 40b' becomes inaccurate. If intensity of the laser beam is weakened for preventing such excessive melting, this in turn causes inadequacy in melting in the front edge portion 40a of the pit as shown in FIG. 17 with resulting inaccuracy in the position of the front edge portion 40a.

If, therefore, data is reproduced from the disc on which the data has been recorded in this manner or from a disc which has been produced from such disc, the reproduced signal contains a large amount of jitter (error in the time base direction) with resulting deterioration in the signal-to-noise ratio.

The pit length can be varied depending upon the number of times a signal "1" or "0" of recorded data continues (e.g., 3T-11T in the case of the CD format).

Figure 18:
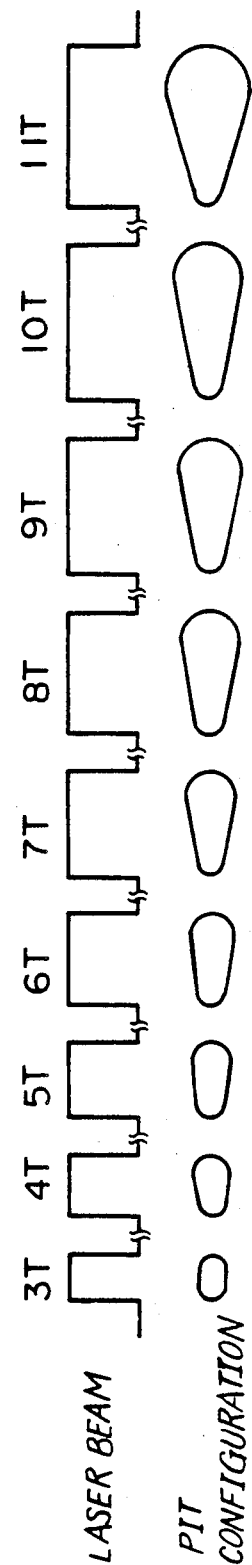
FIG. 18 is a diagram showing the shapes of pits of respective lengths formed by the conventional continuous laser beam.

As the pit length increases, the degree of heating of the recording portion of the disc by the laser beam increases and, accordingly, the width of the pit increases as shown in FIG. 18. For this reason, the longer the pit width, the worse becomes jitter contained in the reproduced signal. Further, the increase in the pit width causes decrease in the rate of laser beam reflection of the disc with resulting increase in loads imposed upon the tracking and focus servo circuits during playback which necessitates increased gain. The increase in the pit width also prevents increase in the density of recorded data.

Accordingly, the data signal correction circuit 36 performs, in addition to the above described increase and decrease control for the data signal timing, a control for splitting data signal timing so that the laser beam is irradiated in the form of a plurality of split pulses within a period of time corresponding to the pit length.

By irradiating the laser beam in such split form, heating of the optical disc 1 can be intermittently made however long the pit length may be so that accumulation of heat is prevented and the excessive melting of the rear edge portion of the pit due to high temperature of the disc recording film as in the continuous irradiation of the laser beam can be prevented. The rear edge of the pit can therefore be formed accurately at a correct position. Besides, since the excessive melting of the rear edge portion of the pit is prevented, power of the laser beam can be increased and this enables forming of the front edge portion of the pit at a correct position. Accordingly, accurate positioning of the front and rear edge portions of the pit can be achieved so that jitter in the reproduced signal can be reduced and the quality of the reproduced signal can be improved due to improvement in the signal-to-noise ratio.

Further, since accumulation of heat in the disc recording film due to laser beam is prevented, the pit width can be made substantially constantly of small value regardless of the pit length. This enables increase in the reflection rate so that loads imposed upon the tracking and focus servo circuits during playback can be reduced and gain thereby can be reduced and moreover the density of recorded data can be increased.

By determining the number of splitting the laser beam in accordance with the pit length (i.e., increasing the number of splitting as the pit length increases), an optimum pit configuration can always be obtained regardless of the pit length.

By increasing the pulse width or power of a first pulse of split laser beam as compared with the pulse width or power of subsequent pulses, melting of the front edge portion of the pit can be further improved and jitter thereby can be further reduced.

An example of split pulses of writing laser beam formed by the data signal correction circuit 36 is shown in FIG. 19(b). FIG. 19(a) illustrates a conventionally used continuous laser beam corresponding to the laser beam of FIG. 19(b). FIG. 19(c) shows the configuration of a pit 50 formed by the split laser beam of FIG. 19(b).

The split laser beam in this example is split into three pulses within a period of time corresponding to the pit length of a pit to be formed. Broken lines 51, 52 and 53 in FIG. 19(c) show pits which are formed when respective pulses P1, P2 and P3 are irradiated singly. By irradiating these pulses P1 through P3 continuously, the pit 50 in which the pits 51, 52 and 53 have become continuous is formed.

By this arrangement, accumulation of heat is reduced owing to irradiation of a split laser beam and widening example of setting of a split laser beam for forming the pits of respective lengths is shown in Table 6.

TABLE 6

|     | $T_{1on}$ [nsec] | $T_{1off}$ [nsec] | $T_{2on}$ [nsec] | $T_{2off}$ [nsec] | $T_{3on}$ [nsec] |
| --- | --- | --- | --- | --- | --- |
| 3T  | 50–500 | — | — | — | — |
| 4T  | (3T PULSE) + 231 | — | — | — | — |
| 5T  | (3T PULSE) + 463 | — | — | — | — |
| 6T  | 50–800 | 50–600 | 50–400 | — | — |
| 7T  | 50–800 | 50–600 | 50–400 | — | — |
| 8T  | 50–800 | 50–600 | 50–400 | — | — |
| 9T  | 50–800 | 50–600 | 50–400 | 50–600 | 50–400 |
| 10T | 50–800 | 50–600 | 50–400 | 50–600 | 50–400 |
| 11T | 50–800 | 50–600 | 50–400 | 50–600 | 50–400 | of the rear edge portion 50b of the pit 50 is held at a smaller degree than in the case of the conventional continuous irradiation of the laser beam. The width of the pit 50 therefore can be made substantially constant in a relatively narrow width so that the rate of reflection can be increased with resulting reduction in loads imposed upon the servo circuit and increase in the density of recorded data.

Besides, since excessive melting of rear edge portion 50b can be prevented, accurate positioning of the rear edge portion 50b can be achieved. Further, since excessive melting of the rear edge portion 50b is prevented, power of the laser beam can be increased so that the front edge portion 50a of the pit melts more easily thereby enabling accurate positioning of the front edge portion 50a. Jitter thereby is reduced and the quality of the reproduced signal is improved due to improvement in the signal-to-noise ratio.

The configuration of the pit 50 varies depending upon factors such as pulse width T, duty ratio Ton/T and power of the split laser beam. These values therefore are adjusted so as to prevent increase in the pit width due to accumulation of heat, position the front edge portion 50a and rear edge portion 50b accurately and prevent discontinuation of the pit 50 in the midway of forming the pit. If the pulse width T of a pulse becomes excessively large, a pit formed by the single pulse is widened in the rear edge portion and, in this case, the advantage of the split pulse will not be obtained. It is therefore preferable to adjust the number of splitting the laser beam in accordance with the pit length of a pit to be formed to achieve a substantially constant pulse width. If the duty ratio Ton/T is excessively increased (i.e., the pulse width is increased), the pit width increases due to accumulation of heat whereas if the duty ratio Ton/T is excessively decreased (i.e., the pulse width is decreased), the pit 50 is discontinued part way through the formation thereof. The duty ratio Ton/T therefore is adjusted to a value at which the pit width will not be excessively large and the discontinuation of the pit 50 will not take place. Since the melting state varies depending also upon the power of the laser beam, the power of the laser beam is also adjusted. Experiments show that a laser beam power which is one and half times the power in the case of the conventional continuous irradiation achieves excellent results.

An example of an experiment conducted with respect to a case where pits are formed on the optical disc 1 with the CD format by employing the above described pulse splitting technique will now be described.

In the DRAW disc of the CD format, data is recorded with a combination of pits having nine kinds of pit lengths of 3T through 11T (1T=1/4.3218 MHz). An In the table, $T_{1on}$, $T_{2on}$ and $T_{3on}$ represent time lengths of rising state of the pulses P1, P2 and P3 and $T_{1off}$ and $T_{2off}$ represent time lengths of a falling portion between the pulses P1, P2 and P3.

In the above example, pit lengths 3T through 5T are split by one, 6T through 8T are split by two and 9T through 11T are split by three. Pit length 5T may be split into two pulses with $T_{1on}$=50–800 nsec, $T_{1off}$=50–600 nsec and $T_{2on}$=50–400 nsec. And, pit length 8T may be split into three pulses with $T_{1on}$=50–800 nsec, $T_{1off}$=50–600 nsec, $T_{2on}$=50–400 nsec, $T_{2off}$=50–600 nsec, $T_{3on}$=50–400 nsec, and pit length 11T may be split into four pulses with $T_{1on}$=50–800 nsec, $T_{1off}$=50–600 nsec, $T_{2on}$=50–400 nsec, $T_{2off}$=50–600 nsec, $T_{3on}$=50–400 nsec, $T_{3off}$=50–600 nsec and $T_{4on}$=50–400 nsec. Pit configurations formed by this split laser beam are shown in FIG. 20 (c). Since the laser beam is irradiated in split form, accumulation of heat is low and the pit width is controlled to a narrow and constant width even if the pit length becomes large. Besides, the front and rear edges of the pit are accurately formed at correct positions.

Figure 21:
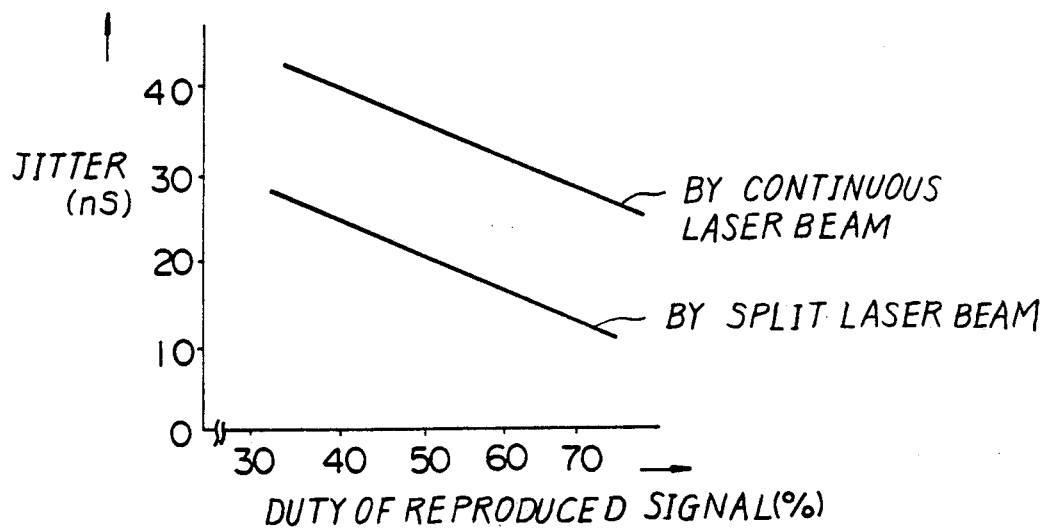
FIG. 21 is a diagram showing the jitter characteristics in cases of forming the pits by the continuous laser beam and of forming the pits by the split laser beam.
Figure 22:
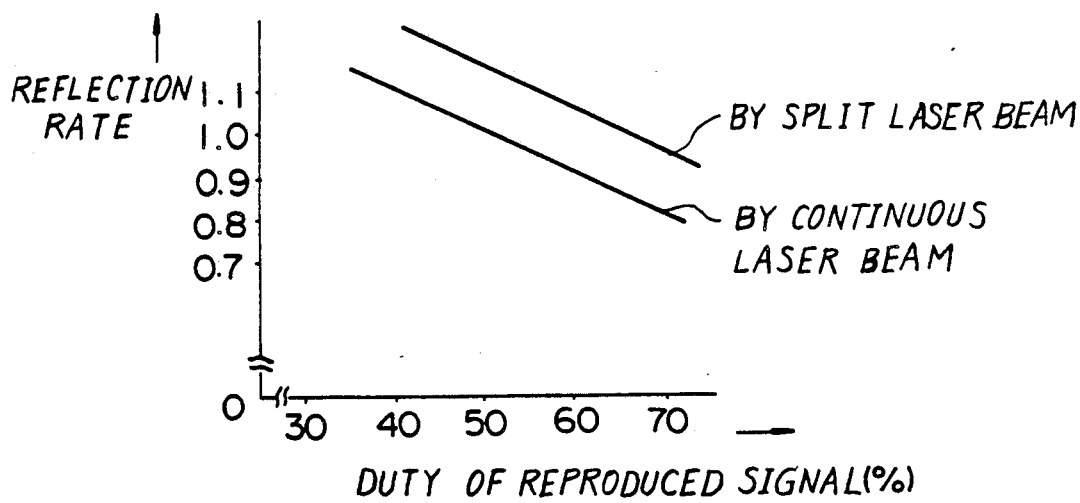
FIG. 22 is a diagram showing the disc reflection rate characteristics during playback in cases of forming the pits by the continuous laser beam and of forming the pits by the split laser beam.

Recording made on a DRAW disc by using this split laser beam has resulted, as shown in FIG. 21, in reduction of jitter in the reproduced signal by 60% with resulting reduction in error as compared with a case where recording is made by using the conventional continuous laser beam. In FIG. 21, the ordinate represents standard deviation of time axis variation of a reproduced signal to a recorded signal and the abscissa represents the duty of the reproduced signal, i.e., ratio of a portion in the reproduced signal corresponding to the pit. The reflection rate after recording has increased, as shown in FIG. 22, by about 10% as compared with a case where recording is made by using the conventional continuous laser beam with resulting alleviation in the load imposed upon the servo circuit. In FIG. 22, the ordinate represents a relative ratio determined with the rate of reflection of the continuous laser beam at the duty 50% of the reproduced signal being taken as 1.

Figures 24, 26:
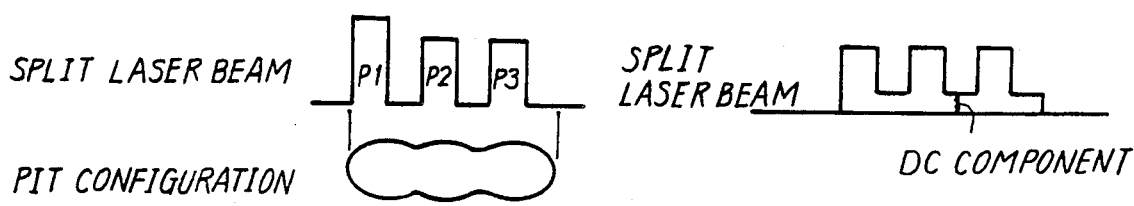
FIGS. 23, 24 and 26 are diagrams showing other examples of the split laser beam.
Figure 23:
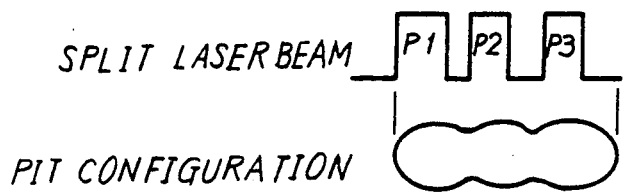

In the above example, there is no difference between the first pulse and subsequent pulses (see FIG. 19(b)). Alternatively, by increasing the pulse width of the first pulse P1 as shown in FIG. 23 (e.g., 1.1 to 2 times of P2 and P3) or increasing the power of the first pulse P1 as shown in FIG. 24 (e.g., 1.05 to 1.43 times of P2 and P3), melting of the front edge portion of the pit is made more accurately and jitter is further removed. Besides, by this arrangement, power can be reduced in subsequent pulses so that a narrower pit can be formed with a result that the reflection rate increases and, therefore, the load imposed upon the servo circuit is alleviated and, further, the density of recorded data is increased.

An example of a case where the pulse width of the first pulse is increased is shown in the following Table 7:

TABLE 7

|  | $T_{1on}$ [nsec] | $T_{1off}$ [nsec] | $T_{2on}$ [nsec] | $T_{2off}$ [nsec] | $T_{3on}$ [nsec] |
|---|---|---|---|---|---|
| 3T | 320 | — | — | — | — |
| 4T | 560 | — | — | — | — |
| 5T | 780 | — | — | — | — |
| 6T | 395 | 450 | 200 | — | — |
| 7T | 575 | 500 | 200 | — | — |
| 8T | 760 | 550 | 200 | — | — |
| 9T | 350 | 500 | 200 | 490 | 200 |
| 10T | 470 | 550 | 250 | 500 | 200 |
| 11T | 605 | 600 | 300 | 500 | 200 |

Figure 25:
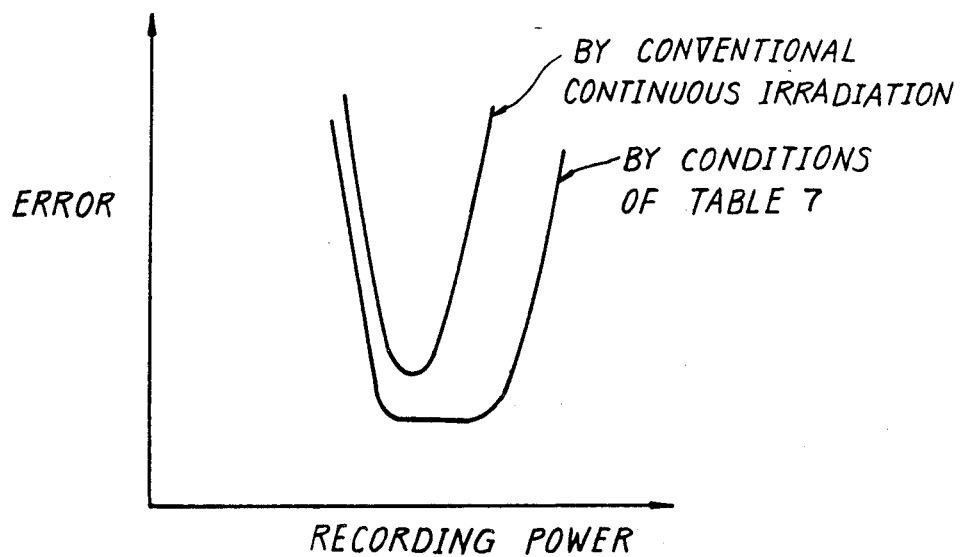
FIG. 25 is a diagram showing, in a relative ratio, recording power versus error occurrence rate under the conditions shown in Table 7.

A relative ratio of the rate of error occurrence to the recording power under the condition of Table 7 is shown in FIG. 25. It will be seen from this figure that occurrence of error has been reduced and the recording power margin is raised as compared with the case of the conventional continuous irradiation.

In the above example, description has been made about the case where the laser beam is completely split (i.e., power is zero at the falling portion of the pulse). Alternatively, the laser beam may be split so as to contain a dc component as shown in FIG. 26.

In the above example, the number of splitting is increased with the increase in the pit length. Alternatively, the laser beam may be irradiated in the form of two pulses provided by splitting the laser beam immediately before the end of a period of time corresponding to the pit length of a signal pit within which the laser beam should be irradiated. By this arrangement, the power of the laser beam is reduced once at a time point immediately before the end of the period of time within which the laser beam should be irradiated. Accordingly, accumulation of heat due to the former pulse is interrupted in this portion so that the adverse influence by the accumulation of heat on forming of the rear edge portion of the pit by the latter pulse is reduced regardless of the pit length and the position of the rear edge portion of the pit thereby can be determined correctly by the latter pulse. Accordingly, jitter is reduced and the quality of the reproduced signal is improved owing to the improvement in the signal-to-noise ratio. Moreover, since the power of the laser beam has only to be reduced once at a time point immediately before the end of the period of time within which the laser beam should be irradiated regardless of the pit length, the circuit construction can be simplified as compared with a case where the laser beam is split by the number corresponding to the pit length.

Figure 27:
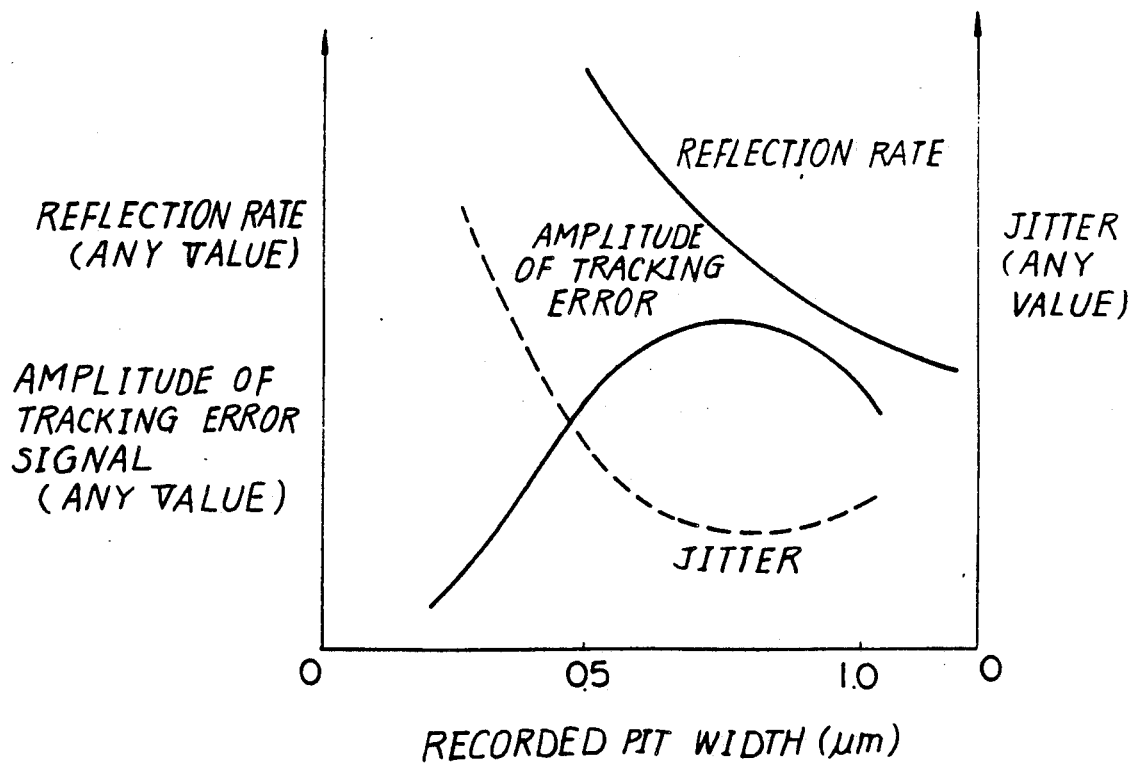
FIG. 27 is a characteristic diagram showing relations between recorded pit width and jitter, tracking error signal amplitude and reflection rate.

FIG. 27 shows the relationship between the recorded pit width and jitter, tracking error signal amplitude (three beam method) and reflection rate. If the recorded pit width is made 0.3 μm to 0.9 μm, jitter is low, tracking error amplitude is large (i.e., gain of the tracking control is large) and reflection rate is large. If the pit width exceeds 0.9 μm, the possibility that a pit of an adjacent track will be read during playback increases whereas if the pit width is less than 0.3 μm, a pit cannot be formed substantially in a good condition. In either case, jitter increases and the quality of the reproduced signal is deteriorated. According to the data signal correction circuit 36, recording of a pit with the recorded pit width of 0.3 μm to 0.9 μm can be made easily.

Figures 28, 29:
FIGS. 28 and 29 are diagrams showing other examples of the split laser beam.

In the above example, description has been made about the case where the laser beam has been completely split. Alternatively, the laser beam may be split in such a manner that it will contain a dc component as shown in FIG. 28. Further, by increasing power of the rise portion of the former pulse P1 as shown in FIG. 29, melting of the front edge portion of the pit is further ensured so that jitter is further removed.

In a semiconductor laser, it takes time for the laser beam to reach a steady state after being turned on so that the length between a position at which the semiconductor laser is turned on and a position at which the front edge portion of a pit is formed tends to become larger as the immediately preceding blank length becomes larger. If, accordingly, weak current is caused to flow in the semiconductor laser in a blank portion, rising of the laser beam when the semiconductor laser has been turned on is quickened with a result that the front edge portion of the pit is determined accurately and jitter is thereby reduced.

In a case where the control for increasing and decreasing the data signal timing and the control for splitting the data signal timing are concurrently used, influences by the pit length and immediately preceding blank length are reduced so that the control for increasing and decreasing the data signal timing can be performed in a somewhat more moderate manner than in the previously described example.

In the above described embodiment, the present invention has been applied to the CD system. The invention however is applicable also to disc systems exclusively adapted for playing back CD-ROM, CD-I, CD-V, LV and the like.

The recording device can be constructed, if necessary, as a device concurrently having a playback function.

The invention is applicable not only to a constant linear velocity type disc system but also to a constant revolution velocity type disc system.

In the above described embodiment, the present invention has been applied to a DRAW disc but the invention is also applicable to an E-DRAW disc.

What is claimed is:

1. An optical disc recording system for recording on an optical disc so that the recording can be played back using a standard playback device for playback only of optical discs, comprising:

an optical disc having a size compatible with a standard playback device for playback only of optical discs and a surface which deforms in response to a laser beam for writing thereon, which has a relatively high rate of laser beam reflection and which has at least one pregroove therein of relatively small depth; and a recording device for recording on the optical disc, the recording device including data signal outputting means responsive to an input signal to be recorded for providing the input signal at a predetermined transfer speed as a data signal of mark length compatible with a standard playback device for playback only of optical discs, means for providing a laser beam, drive control means for driving the optical disc at a speed compatible with a standard playback device for playback only of optical discs and for controlling application of the laser beam to the optical disc to achieve a track pitch compatible with a standard playback device for playback only of optical discs, and laser control means for varying the laser beam in accordance with the data signal provided by the data signal outputting means, whereby the optical disc as recorded by the recording device can be played back using a standard playback device for playback only of optical discs.

2. An optical disc recording system as defined in claim 1, wherein the recording device further includes data signal correction means for providing waveform adjustment of the data signal in accordance with the length and immediately preceding blank length of pits to be formed on the optical disc.

3. An optical disc recording system as defined in claim 2, wherein the data signal correction means includes means for varying timing of the data signal to compensate for heat accumulation caused by laser beam irradiation on the surface of the optical disc and means for splitting timing of the data signal to prevent increases in the widths of pits formed on the optical disc.

4. An optical disc recording system as defined in claim 3, wherein the means for varying timing of the data signal is operative to shorten irradiation time of the laser beam during formation of a pit preceded by a blank of relatively short length, to advance the start of irradiation of the laser beam during formation of a pit preceded by a blank of relatively long length, and to shorten irradiation time of the laser beam during formation of a pit of relatively long length, and the means for splitting timing of the data signal is operative to provide split laser beam pulses in a number, width and intensity which maintains the widths of pits formed on the optical disc in the range of 0.3–0.9 μm.

5. An optical disc recording system as defined in claim 1, wherein the surface of the optical disc has a laser beam reflecting rate in the range of 59–75%.

6. An optical disc recording system as defined in claim 1, wherein the at least one pregroove in the surface of the optical disc has a depth in the range of 20–50 nm.

* * * * *